US008745743B2

(12) United States Patent
Turbin et al.

(10) Patent No.: US 8,745,743 B2
(45) Date of Patent: Jun. 3, 2014

(54) ANTI-VIRUS TRUSTED FILES DATABASE

(75) Inventors: Pavel Turbin, Jokela (FI); Yuri Fialkin, Espoo (FI)

(73) Assignee: F-Secure Oyj, Helsinki (FI)

( * ) Notice: Subject to any disclaimer, the term of this patent is extended or adjusted under 35 U.S.C. 154(b) by 676 days.

(21) Appl. No.: 12/455,910

(22) Filed: Jun. 9, 2009

(65) Prior Publication Data

US 2010/0313035 A1 Dec. 9, 2010

(51) Int. Cl.
G06F 21/00 (2013.01)
G06F 17/30 (2006.01)
G06F 12/14 (2006.01)
G06F 21/56 (2013.01)
G06F 21/64 (2013.01)

(52) U.S. Cl.
CPC ............... *G06F 21/56* (2013.01); *G06F 21/64* (2013.01); *G06F 17/30109* (2013.01)
USPC .............. 726/24; 713/176; 713/188; 713/189

(58) Field of Classification Search
CPC .... G06F 21/56; G06F 21/64; G06F 17/30109
USPC ......................................................... 713/188
See application file for complete search history.

(56) References Cited

U.S. PATENT DOCUMENTS

| | | | | |
|---|---|---|---|---|
| 5,606,609 A * | 2/1997 | Houser et al. | | 713/179 |
| 6,094,731 A * | 7/2000 | Waldin et al. | | 714/38.14 |
| 6,715,067 B1 * | 3/2004 | Rhoads et al. | | 713/1 |
| 7,373,659 B1 * | 5/2008 | Vignoles et al. | | 726/11 |
| 8,087,086 B1 * | 12/2011 | Lai et al. | | 726/24 |
| 2003/0177178 A1 * | 9/2003 | Jones et al. | | 709/203 |
| 2005/0131835 A1 * | 6/2005 | Howell | | 705/64 |
| 2005/0198061 A1 * | 9/2005 | Robinson et al. | | 707/102 |
| 2005/0223239 A1 * | 10/2005 | Dotan | | 713/188 |
| 2006/0021032 A1 * | 1/2006 | Challener et al. | | 726/22 |
| 2006/0218637 A1 * | 9/2006 | Thomas et al. | | 726/23 |
| 2006/0230451 A1 * | 10/2006 | Kramer et al. | | 726/22 |
| 2007/0038677 A1 * | 2/2007 | Reasor et al. | | 707/200 |
| 2007/0079112 A1 * | 4/2007 | Lewis et al. | | 713/2 |
| 2007/0079377 A1 * | 4/2007 | Pagan | | 726/24 |
| 2007/0150948 A1 * | 6/2007 | De Spiegeleer | | 726/22 |
| 2008/0077994 A1 * | 3/2008 | Comlekoglu | | 726/27 |
| 2009/0217050 A1 * | 8/2009 | Amiel et al. | | 713/176 |
| 2010/0132038 A1 * | 5/2010 | Zaitsev | | 726/22 |
| 2010/0138924 A1 * | 6/2010 | Heim et al. | | 726/24 |
| 2010/0169972 A1 * | 7/2010 | Kuo et al. | | 726/23 |
| 2010/0275026 A1 * | 10/2010 | Mclean | | 713/176 |

OTHER PUBLICATIONS

"Chapter 2, Protocol Building Blocks", Bruce Schneier, Applied Cryptography, 1997, pp. 21-46.

* cited by examiner

*Primary Examiner* — Matthew Henning
(74) *Attorney, Agent, or Firm* — Harrington & Smith

(57) ABSTRACT

A method and apparatus for populating a trusted files database for an anti-virus application. A determination is made from several files stored in a file system of a set of files likely to be accessed from the file system. For each file that is likely to be accessed from the file system, a further determination is made to ascertain if the file is trusted by the anti-virus application. If the file is likely to be accessed from the file system, and is trusted, then it is identified in a trusted files database. By only including files that are likely to be accessed by the file system, the time to populate the trusted files database is greatly reduced.

17 Claims, 2 Drawing Sheets

ANTI-VIRUS TRUSTED FILES DATABASE

TECHNICAL FIELD

The present invention relates to a trusted files database for an anti-virus application.

BACKGROUND OF THE INVENTION

Malware is short for malicious software and is used as a term to refer to any software designed to infiltrate or damage a computer system without the owner's informed consent. Malware can include viruses, worms, trojan horses, rootkits, adware, spyware and any other malicious and unwanted software. Any computer device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Detecting malware is challenging as the malware authors design their software to be difficult to detect, often employing technology that deliberately hides the presence of malware on a system, i.e. the malware application may not show up on the operating system tables that list currently running processes.

Computer devices make use of anti-virus software to detect and possibly remove malware. Anti-virus software can make use of various methods to detect malware including scanning, integrity checking and heuristic analysis. Of these methods, malware scanning involves the anti-virus software examining files for a virus fingerprint or "signature" that is characteristic of an individual malware program. Typically, this requires that the anti-virus software has a database containing the signatures. When the provider of the anti-virus software identifies a new malware threat, the threat is analysed and its signature is extracted. The malware is then "known" and its signature can be supplied as updates to the anti-virus software database. However, scanning files for malware can consume significant processing resources potentially resulting in a reduction in the performance of a computing device.

In order to reduce this processing burden, some anti-virus solutions provide for one or more databases of trusted files that are highly unlikely to be a source of malware. These trusted files are those files published or authored by trusted sources. For example, those files that make up a piece of software distributed by a reputable software provider could be considered to be trustworthy such that, provided such files have not been modified since their publication/release, these files need not be scanned for malware.

The provider of the anti-virus software identifies files that can be considered trustworthy and applies a one-way hash function to the file to convert it to a fixed-length string known as a hash value (also known as a digest). For a description of one-way hash functions see Chapter 2 of Applied Cryptography by Bruce Schneier, 1997. The hash value provides a fingerprint of the file that is highly unlikely to be duplicated by another input. Given the extremely small probability of such a 'collision' and the one-way nature of a hash function, it is extremely difficult or almost impossible to calculate the input that has produced a given hash value, even though the hash function used to generate the hash value is publicly available. The list of the hash values of these trusted files is secured against unauthorised modification (i.e. by digitally signing the trusted file list) and provided to a user's device.

Prior to scanning a given file to determine if the file could possibly be or contain malware (for example when prompted by the user, when due to perform a scheduled scan, or when initiated in response to a request to run the file or in response to the receipt of the file), the anti-virus software will determine if the file is in the trusted file database. The anti-virus software applies the same one-way hash function to the file to be checked and then compares the resulting hash value with the trusted file database provided by the supplier of the anti-virus software. If a match is found in the database, there is an extremely high probability that this file can be trusted, i.e. it is from a trusted source and has not been modified since its first publication, and therefore it need not be scanned for malware.

When an anti-virus application is first installed on a device, it must build a trusted file database, as the anti-virus supplier does not necessarily know what files are in use, or are likely to be used, in each user device. Given that there are thousands of files that are published by a variety of trusted sources, these trusted file databases are large and can consume a significant amount of memory. More importantly, it can take many hours for an anti-virus application to build a trusted files database by scanning files stored in a memory. This problem can be exacerbated when the anti-virus application is installed on a device that has been in use for some time; the device may include a large number of data files such as user documents, photographs, cache files, temporary files and other content that must be scanned but is irrelevant for the purpose of populating the trusted files database. Populating the trusted files database can take more time than is saved in subsequent scans.

SUMMARY OF THE INVENTION

The inventors have realised the problems with prior art trusted files databases for anti-virus applications. It is an object of the invention to reduce the time it takes to populate a trusted files database.

According to a first aspect of the invention, there is provided a method of populating a trusted files database for an anti-virus application. A determination is made from several files stored in a file system of a set of files likely to be accessed from the file system. For each file that is likely to be accessed from the file system, a further determination is made to ascertain if the file is trusted by the anti-virus application. If the file is likely to be accessed from the file system, and is trusted, then it is identified in a trusted files database. By only including files that are likely to be accessed by the file system, the time to populate the trusted files database is greatly reduced.

In an optional embodiment, the step of determining if the file is trusted by the anti-virus application comprises determining if the file is associated with a valid digital signature. If it is, then it can be verified that the signature belongs to a trusted source.

There are several ways of determining files likely to be accessed from the system. Examples of such ways include any of:
 files currently being accessed;
 files having associated shortcuts;
 files to be used when a computer device is started;
 files to be used when a computer device is re-booted,
 system Registry entries;
 information identifying when a file was last accessed from the file system; and information identifying how frequently a file is accessed from the file system.

Another way to determine which files are likely to be accessed by the system is to select files related to at least one file identified in the trusted files database. Examples of a file being related to another file already identified in the trusted database include files stored in the same folder as the trusted file, files originating from the same vendor, or files associated with the same software application.

As the trusted files database should only include reasonably persistent files, in an optional embodiment the set of files excludes data files, as these can be altered frequently.

In the event that new files are stored in the file system, for example, when a new software application is installed, the method optionally comprises determining that at least one newly installed file is stored in the file system, determining whether the newly installed file is likely to be accessed from the file system, determining if the newly installed file is trusted by the anti-virus application and if so then identifying the newly installed file in the trusted files database.

There are several ways in which the file can be identified in the trusted files database. In an optional embodiment, the file is identified by identifying a location of the file in the trusted files database. The location of the file is optionally identified by one of adding a file path to the trusted files database, and generating a value using to the file path and adding the file path value to the trusted files database.

As an option, the step of determining if the file is associated with a valid digital signature comprises determining if the file has a valid embedded or attached signature.

In some cases, a file that is likely to be accessed from the file system does not have a valid embedded or attached signature. In this case, and as an optional embodiment, the method further comprises generating a value based on the contents of the file and determining if the value is listed in a catalog having a valid embedded or attached digital signature.

Optionally, the digital signature relies upon a public key infrastructure.

The invention optionally comprises further performing a malware scan of files stored in the file system, and omitting files identified in the trusted files database from the malware scan.

As an option, the method is performed immediately after installing the anti-virus application.

According to a second aspect of the invention, there is provided a computer device comprising a memory for storing a plurality of files. An exclusion module is provided for determining from the plurality of files a set of files likely to be used at the computer. A trust verification module is provided for determining if a file from the set of files is trusted, and a trusted files database is provided for storing the identities of files authenticated by the authentication module.

According to a third aspect of the invention, there is provided a recording medium storing computer interpretable instructions for causing a programmable computer to perform a method of populating a trusted files database for an anti-virus application. The method is as follows: A determination is made from several files stored in a file system of a set of files likely to be accessed from the file system. For each file that is likely to be access from the file system, a further determination is made to ascertain if the file is trusted by the anti-virus application. If the file is likely to be accessed by the file system, and is trusted, then it is identified the file in a trusted files database. By only including files that are likely to be accessed by the file system, the time to populate the trusted files database is greatly reduced.

According to a fourth aspect of the invention, there is provided a recording medium storing computer interpretable instructions for causing a programmable computer to perform as a computer that has an exclusion module for determining from the plurality of files a set of files likely to be used at the computer, a trust verification module for determining if a file from the set of files is trusted, and a trusted files database for storing the identities of files authenticated by the authentication module.

DETAILED DESCRIPTION OF THE INVENTION

As has already been described, being able to identify files that have been supplied, published or authored by a source that can be considered trustworthy reduces the processing burden when anti-virus software performs malware scanning. Given that there are a very large number of files that could be considered trustworthy, a list of trustworthy files may consume a significant amount of memory within a device and can take a long time to populate.

Figure 1:
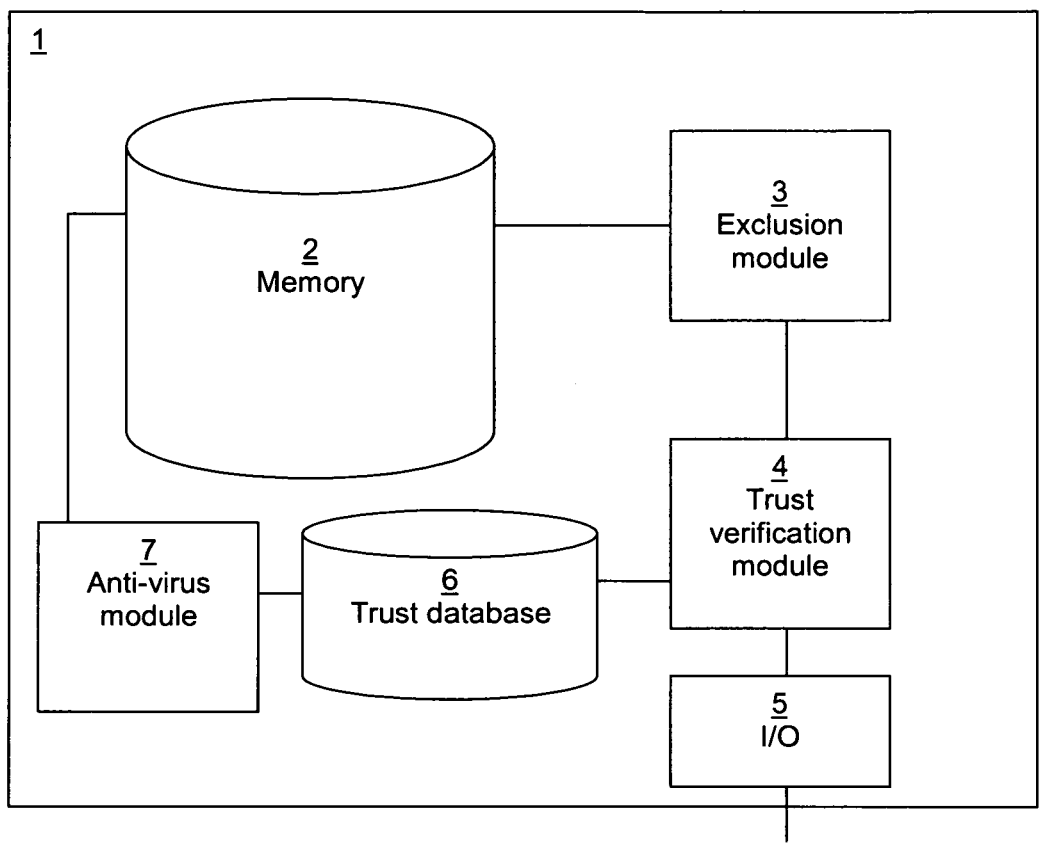
FIG. 1 illustrates schematically a computer device for populating a trusted files database according to an embodiment of the present invention.

Referring to FIG. 1, a computer device 1 is illustrated schematically. The computer device has a memory 2 for storing a plurality of files in a file system. And exclusion module 3 is provided, and a trust verification module 4 is provided. The trust verification module 4 is able to communicate with remote nodes via an In/Out device 5. A trust database 6 identifying trusted files is provided in this particular embodiment. An antivirus module 7 is also provided which is able to perform malware scans of the plurality of files stored in the memory 2, and can access the trust database 6 to ensure that files stored in the memory 2 that are also identified in the trust database 6 are not scanned, thereby speeding up the scanning process.

Figure 2:
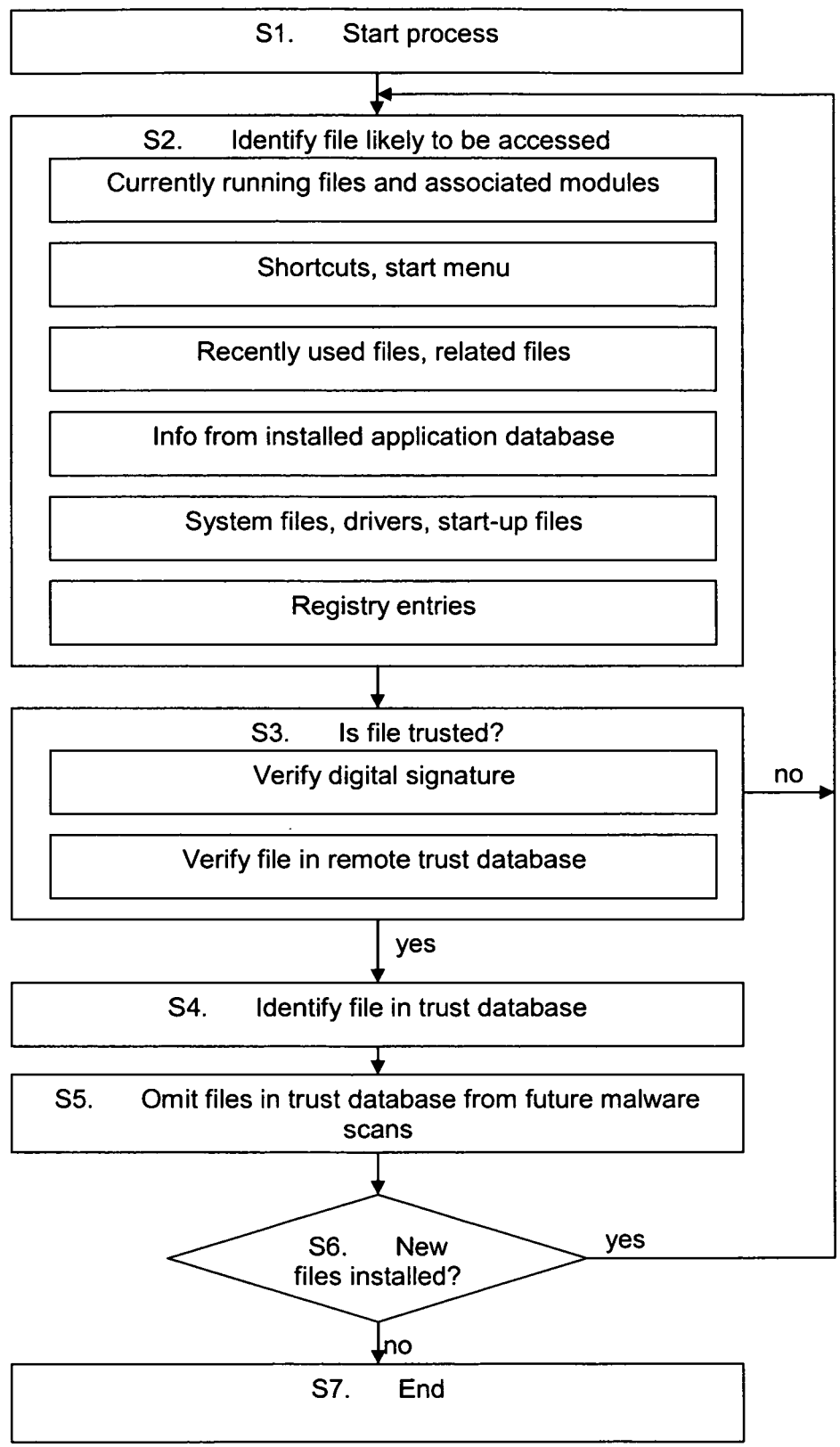
FIG. 2 is a flow diagram illustrating the process of populating a trusted files database according to an embodiment of the present invention.

FIG. 2 is a flow diagram illustrating how the components illustrated in FIG. 1 interact with one another. The following numbering corresponds with the numbering of FIG. 2:

S1. The exclusion process starts on the computer device. This will typically first occur immediately after first installing software that includes the exclusion module 3 and trust verification module 4.

S2. The exclusion module 3 identifies those files in the file system that are likely to be accessed. There are several ways in which the exclusion module can identify files likely to be accessed. For examples, the exclusion module 3 can determine which files are already being accessed and run on the computer system. Another way is to identify files that are likely to be accessed is to identify files that have associated shortcuts in a system such as Microsoft Windows®. Installed applications can be used to determine which files have been recently used, or the frequency of use of particular files. A determination can be made of which files will be accessed when the computer device is booted or re-booted. System Registry entries can be used to determine files likely to be accessed. Another way to identify files likely to be accessed is to select one or more files likely to be accessed using any of the above described methods, and then to determine any related files. Examples of related files include files stored in the same folder, files originating from the same vendor, or files associated with the same software application as the already identified file. Once a file has been identified as likely to be accessed from the file system, the file identity is made known to the trust verification module. It will be appreciated that any combination of the methods of determining whether a file is likely to be accessed described above can be used.

S3. Once it has been determined that a file is likely to be accessed, the trust verification module 4 determines whether or not the file can be trusted. There are several ways in which such a determination can be made. For example, the trust verification module can determine whether the identified file is associated with a valid digital signature. The trust verification module 4 uses the In/Out device 5 to query a remote trusted files database to determine whether the file's embedded or attached signature is valid. This query may use a public key infrastructure. An alternative method is to generate a value (such as a hash value) based on the file contents, and to query a remote database to determine whether the value is listed in the remote database and has a valid embedded or attached digital signature. There are many ways in which a determination of whether the file can be trusted can be made, including using information such as the file author, date of creation, file location and so on. The above examples of methods used to determine whether a file can be trusted are provided as examples only, and it will be appreciated that any method to determine whether the anti-virus module can trust the file may be used.

If the file is not trusted, then it will not be included in the trust database 6.

It will be appreciated that in practice, it is preferable for steps S2 and S3 will run concurrently, so once the exclusion module 3 has identified a file likely to be accessed from the file system and passed the file identity to the trust verification module 4, the exclusion module 3 continues to scan for further files likely to be accessed from the file system.

S4. Once it has been determined that the file can be trusted, it is identified in the trust database 6. There are several ways in which the file can be identified in the trust database 6. It may, for example, simply be identified by name, by location (such as a file path), or by generating hash value or other value that identifies the file path.

S5. Once the trust database 6 has been populated with the identities of trusted files that are likely to be accessed from the file system, it can be used by the anti-virus module 7. When the anti-virus module 7 performs a malware scan of files stored in the files system at the memory 2, it determines from the trust database 6 which files can be omitted from the malware scan. By omitting trusted files that are likely to be accessed from the file system, the malware scan takes much less time.

S6. In the event that new files are installed in the file system, for example if a new software application is installed, then steps S2 and S3 may be repeated for the new files to ensure that the trust database 6 remains up to date.

The invention ensures that only trusted files that are likely to be accessed from a file system are populated in a trust database 6. This means that when a user first installs a new anti-virus application, the time it takes to populate a trust database 6 is greatly reduced, as prior art methods of populating a trust database will perform a check of a whether a file can be trusted even if it may never be accessed from the file system. The reduction in time to populate the trust database 6 enhances the user experience. Furthermore, the invention is preferably carried out immediately after installation of the software containing the exclusion module 3 and the trust verification module 4, rather than at the next reboot of the device on which the software is installed. This ensures that the user is not kept waiting for a significant amount of time when the device is subsequently rebooted, and the device is not trying to execute other start-up tasks that may compete for processing resources, slowing down the population process.

It should also be noted that whilst the above description refers to files, it is preferred that the files do not include user data files, but only binaries, executables and associated modules such as dynamic link library (dll) files. The reason for this is that executables, binaries and associated modules are reasonably persistent. In other words, they are likely to remain unchanged in the file system for significant periods of time. Data files, on the other hand, are much more likely to be changed regularly as they are amended or updated. Such files are not suitable for storing in a trust database 6 of files that are to be excluded from a malware scan.

It will be appreciated by the person of skill in the art that various modifications may be made to the above described embodiments without departing from the scope of the present invention.

The invention claimed is:

1. A method of populating a trusted files database for an anti-virus application, the method comprising:
    using the anti-virus application to determine from a plurality of files stored in a file system, a subset of files less than the plurality of files likely to be accessed from the file system, wherein the step of determining the subset of files likely to be accessed from the file system comprises selecting files identified by any of files currently being accessed, files having associated shortcuts, system Registry entries, information identifying when a file was last accessed from the file system, and information identifying how frequently a file is accessed from the file system;
    for each file of the subset of files, determining if the file is trusted by the anti-virus application; and
    identifying the file in a trusted files database;
    wherein the method is first performed immediately after installing the anti-virus application, and prior to the anti-virus application carrying out a malware scan.

2. A method according to claim 1, wherein the step of determining if the file is trusted by the anti-virus application comprises determining if the file is associated with a valid digital signature and, if it is, then verifying that the signature belongs to a trusted source.

3. A method according to claim 2, wherein the step of determining if the file is associated with a valid digital signature comprises determining if the file has a valid embedded or attached signature.

4. A method according to claim 3, comprising, in the event that the file does not have a valid embedded or attached signature then:
    generating a value based on the contents of the file; and
    determining if the value is listed in a catalog having a valid embedded or attached digital signature.

5. A method according to claim 2, wherein said digital signature relies upon a public key infrastructure.

6. A method according to claim 1, wherein the step of determining a subset of files likely to be accessed from the file system comprises selecting files related to at least one file identified in the trusted files database.

7. A method according to claim 6, comprising determining that a file is related to at least one file already identified in the trusted files database in the event that
    the files are stored in the same folder;
    the files originate from the same vendor; or
    the files are associated with the same software application.

8. A method according to claim 1, wherein the subset of files excludes data files.

9. A method according to claim 1, further comprising:
   determining that at least one newly installed file is stored in the file system;
   determining whether the newly installed file is likely to be accessed from the file system;
   determining if the newly installed file is trusted by the anti-virus application; and
   identifying the newly installed file in the trusted files database.

10. A method according to claim 1, the method comprising, in the event that the file is trusted, identifying a location of the file in the trusted files database.

11. A method according to claim 10, wherein the location of the file is identified by one of
   adding a file path to the trusted files database; and
   generating a value using to the file path and adding the file path value to the trusted files database.

12. A method according to claim 1, the method further comprising:
   performing a malware scan of files stored in the file system, and omitting files identified in the trusted files database from the malware scan.

13. A method according to claim 1, wherein said subset of files likely to be accessed from the file system contains less than all of the plurality of files in the file system.

14. A computer device comprising:
   a memory for storing plurality of files;
   an exclusion module for determining from the plurality of files a subset of files less than the plurality of files likely to be used at the computer, wherein the step of determining the subset of files likely to be used at the computer first occurs immediately after first installing software that includes the exclusion module, and prior to an anti-virus application carrying out a malware scan, and comprises selecting files identified by any of files currently being accessed, files having associated shortcuts, system Registry entries, information identifying when a file was last accessed from the file system, and information identifying how frequently a file is accessed from the file system;
   a trust verification module for determining if a file from the subset of files is trusted, wherein the step of determining if a file from the subset of files is trusted first occurs immediately after first installing software that includes the trust verification module, and prior to the anti-virus application carrying out the malware scan; and
   a trusted files database containing identities of files authenticated by the authentication module.

15. A non-transitory recording medium storing computer interpretable instructions for causing a programmable computer to perform a method to populate a trusted files database according to claim 1.

16. A non-transitory recording medium storing computer interpretable instructions for causing a programmable computer to perform as a computer according to claim 14.

17. A method of decreasing response time for an anti-virus application, the method comprising:
   populating a trusted files database by using the anti-virus application to determine from a plurality of files stored in a file system, a subset of files likely to be accessed from the file system, but less than said plurality of files, wherein the step of determining the subset of files likely to be accessed from the file system comprises selecting files identified by any of files currently being accessed, files having associated shortcuts, system Registry entries, information identifying when a file was last accessed from the file system, and information identifying how frequently a file is accessed from the file system;
   for each selected file of the set of files more likely to be accessed, determining if each selected file is trusted by the anti-virus application; and
   adding each selected file to a trusted files database; wherein the method is first performed immediately after installing the anti-virus application, and prior to an anti-virus application carrying out a malware scan.

* * * * *

UNITED STATES PATENT AND TRADEMARK OFFICE
CERTIFICATE OF CORRECTION

PATENT NO. : 8,745,743 B2  
APPLICATION NO. : 12/455910  
DATED : June 3, 2014  
INVENTOR(S) : Turbin et al.

Page 1 of 1

It is certified that error appears in the above-identified patent and that said Letters Patent is hereby corrected as shown below:

In the Claims

Claim 14, col. 7, line 28 insert --a-- in between "storing" and "plurality".

Signed and Sealed this
Twenty-sixth Day of August, 2014

Michelle K. Lee
*Deputy Director of the United States Patent and Trademark Office*